United States Patent [19]

Itoh

[11] Patent Number: 4,559,432
[45] Date of Patent: Dec. 17, 1985

[54] WIRE EDM FOR DETECTING DISCHARGE CONCENTRATIONS USING INDUCTANCE

[75] Inventor: Tetsuroh Itoh, Aichi, Japan

[73] Assignee: Mitsubishi Denki Kabushiki Kaisha, Tokyo, Japan

[21] Appl. No.: 519,642

[22] Filed: Aug. 2, 1983

[30] Foreign Application Priority Data

Aug. 2, 1982 [JP] Japan .................................. 57-134920
Aug. 10, 1982 [JP] Japan .................................. 57-138947
Aug. 10, 1982 [JP] Japan .................................. 57-138948

[51] Int. Cl.$^4$ .............................................. B23P 1/08
[52] U.S. Cl. .............................. 219/69 W; 219/69 C; 219/69 S; 219/69 P
[58] Field of Search .............. 219/69 W, 69 M, 69 G, 219/69 P, 69 S, 69 C; 318/565, 601

[56] References Cited

U.S. PATENT DOCUMENTS

| | | | |
|---|---|---|---|
| 3,778,579 | 12/1973 | Takarada | 219/69 S |
| 3,816,692 | 6/1974 | Ratmansky | 219/69 S |
| 3,916,138 | 10/1975 | Pfau | 219/69 C |
| 4,321,451 | 3/1982 | Inoue | 219/69 C |
| 4,350,863 | 9/1982 | Inoue | 219/69 C |
| 4,456,960 | 6/1984 | Wakai | 318/565 |

FOREIGN PATENT DOCUMENTS

| | | | |
|---|---|---|---|
| 38662 | 10/1981 | European Pat. Off. | 219/69 P |
| 52-52299 | 4/1977 | Japan | 219/69 C |
| 52-58194 | 5/1977 | Japan | 219/69 P |
| 52-58195 | 5/1977 | Japan | 219/69 W |
| 147594 | 11/1979 | Japan | 219/69 W |
| 144626 | 9/1982 | Japan | 219/69 C |
| 574297 | 9/1977 | U.S.S.R. | 219/69 S |

Primary Examiner—C. L. Albritton
Assistant Examiner—Geoffrey S. Evans
Attorney, Agent, or Firm—Sughrue, Mion, Zinn, Macpeak & Seas

[57] ABSTRACT

A wire type electric discharge machining device monitors the location of discharges occurring within the gap between a wire electrode and workpiece. The location is determined as a function of the inductance between the discharge point and the power supply, which inductance is determined by examining the discharge current waveform. When an excessive number of consecutive discharges occur at the same location in the gap, the device regulates the value of the pulse voltage applied to the machining gap, or the quiescent time thereof.

14 Claims, 6 Drawing Figures

WIRE EDM FOR DETECTING DISCHARGE CONCENTRATIONS USING INDUCTANCE

BACKGROUND OF THE INVENTION

This invention relates to a machine employed to electrically cut a workpiece using a wire electrode.

The use of electrical energy for machining workpieces is widely known and employed and, as one of the latest techniques attracting attention, there is wire cutting electric discharge device which employs a wire-shaped electrode to electrically machine a workpiece as if the workpiece were machined by a fretsaw.

FIG. 1 is a constructional view illustrating the principles upon which the machine for implementing the above is based. In FIG. 1, a workpiece 1 is installed opposite to a wire electrode 2 via insulating liquid 3. The insulating liquid 3 is hereinafter referred to as the working liquid. The working liquid is jetted from a nozzle 6 across the gap between the workpiece 1 and the wire electrode 2 through a tank 4 and a pump 5. Relative movement of the workpiece 1 and the wire electrode 2 is carried out by a moving table 11 on which the workpiece 1 is mounted. The table 11 is driven by a Y-axis driving motor 13 and an X-axis driving motor 12. According to this arrangement, relative movement of the workpiece 1 and the electrode 2 corresponds to two-dimensional planar movement in terms of the aforementioned X, Y axis planes. The wire electrode 2 is supplied from a wire supply reel 7, is passed through a lower wire guide 8A and the workpiece 1, reaches an upper guide 8B, and is then wound on a wire reel also serving as a tension roller 10 via an electric energy supply assembly. The operating power supply 15 for supplying the electrical energy is quite similar to that shown in the example illustrated herein and is composed of a d.c. power supply 16, a switching element 17, a current limiting resistor 19 and a control circuit 20 for controlling the switching element 17. There is also shown a control unit 14 for driving and controlling the X, Y axis motors 12, 13 and, as parts thereof, there are device controlling units, copying units and computer-controlled units which are of ordinary types.

The operation of the conventional wire cut electric discharge machine is as follows:

In a normal machining condition, a high frequency pulse voltage is applied by the operating power supply 15 and part of the workpiece 1 is fused and scattered with the discharge explosion caused by one pulse. Since the liquid in the interpole gap is gasified and ionized because of the high temperature, a certain period of quiescent time is required until the next pulse voltage is applied. If this quiescent time is too short, the interpole gap will not yet be again sufficiently insulated. As a result, a concentration of electric discharges in the same place for a second time causes the fusing of the wire electrode 2.

Accordingly, it is common in the case of an ordinary operating power supply to set up electrical conditions including the quiescent time of the operating power supply 15 depending on the kind of workpiece and plate thickness, and to carry out electric discharge machining with such electrical conditions as are more than necessary to prevent the wire electrode from being cut. Consequently, the machining speed will inevitably be reduced to a value considerably lower than the logical threshold value, and the fusing of the wire electrode 2 is inescapable should there be an inequality of the wire electrode diameter or any projection thereon or flaw thereof.

As noted above, the disadvantage of the conventional wire cut electric discharge machine is that the machining speed is extremely low because the output energy of the operating power supply is reduced to prevent the wire electrode 2 from being fused even if electric discharges are concentrated in one place.

SUMMARY OF THE INVENTION

An object of the present invention is to provide a highly reliable wire cutting-type electric discharge machine, which avoids the disadvantages of the prior art by analyzing the inductance component between the electrical energy supply assembly and the discharge point in the workpiece and the current waveform determined by this inductance in order to determine the presence or absence of a concentration of discharge points, indicating the results of this analysis by detecting the occurrence of the discharge concentrations, and regulating the value of the pulse voltage applied to the machining gap or the quiescent time thereof.

DETAILED DESCRIPTION OF THE PREFERRED EMBODIMENTS

Figure 1:
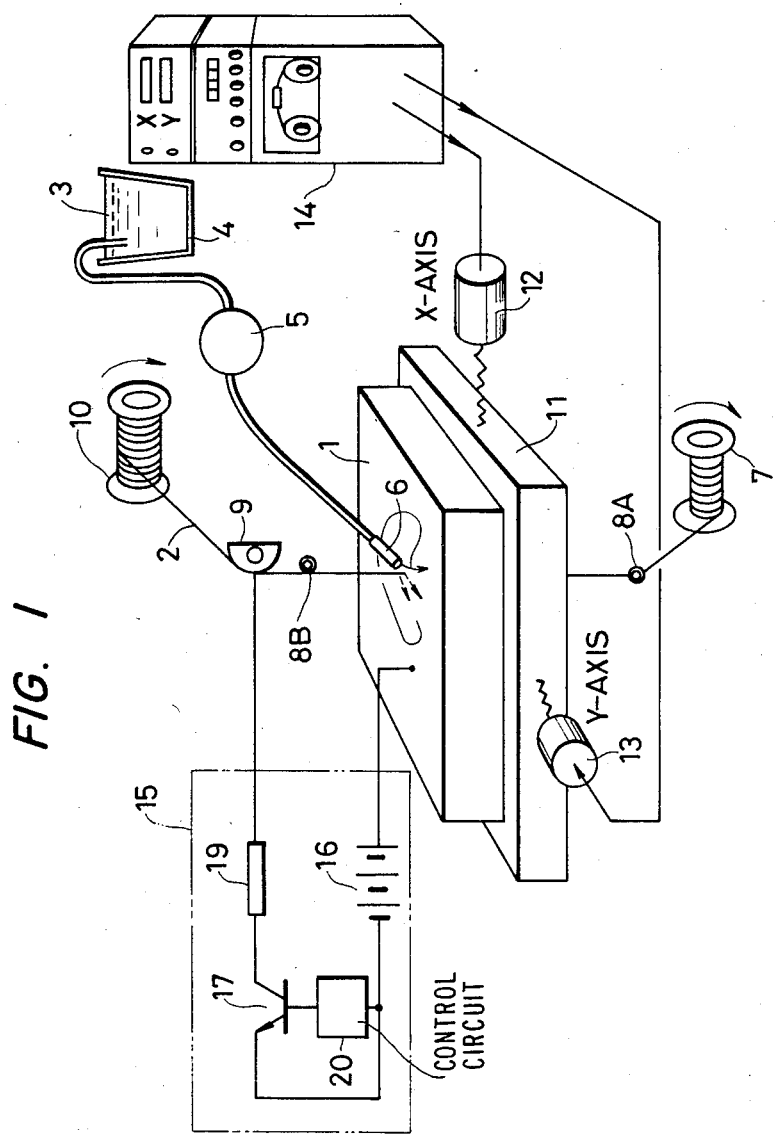
FIG. 1 is a diagram showing the principle on which the conventional wire cut electric discharge machine operates.
Figure 2:
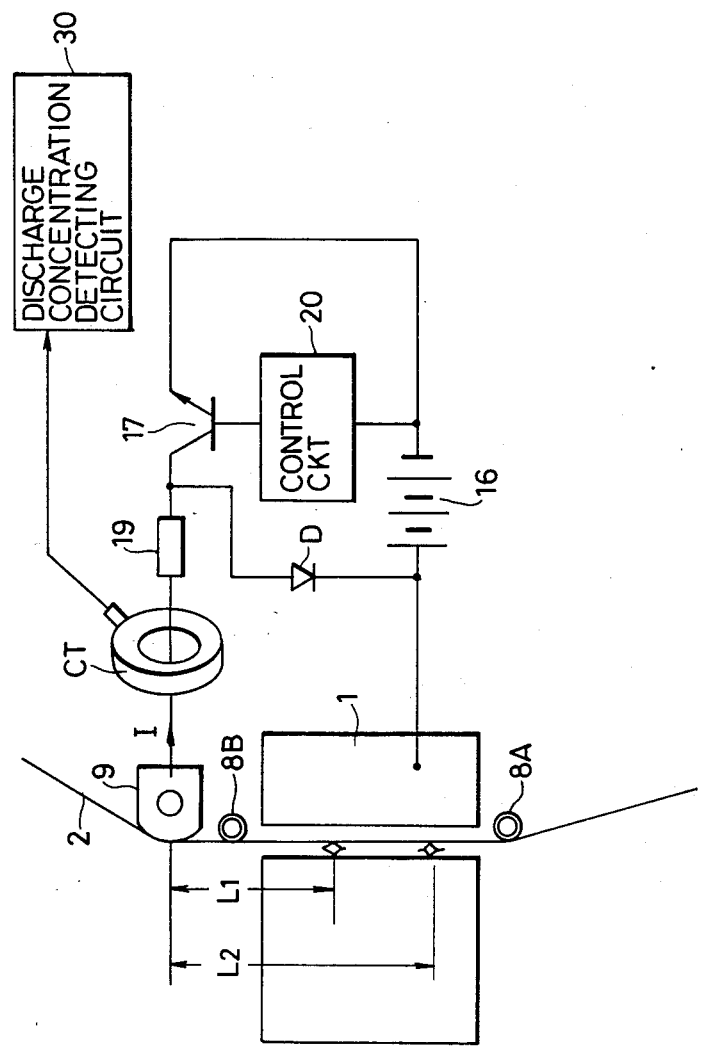
FIG. 2 is a diagram illustrating the principles of detection according to the present invention.

Referring now to FIG. 2, the principles of the present invention are described. In FIG. 2, there is shown a current transformer CT for detecting an interpole current I. The value of the interpole current I is caused to have different waveforms according to the inductance determined by the distance between a discharge point and a current feed 9. Assuming that the distances from the current feed 9 to two discharge points are L1 and L2, each inductance being l1, l2, the interpole current I is expressed as follows:

$$I1 = E/R \left( 1 - \exp \frac{-R}{l1} t \right)$$

$$I2 = E/R \left( 1 - \exp \frac{-R}{l2} t \right)$$

where R = resistance of the current limiting resistor; and E = voltage of the d.c. power line. Therefore, assuming that T represents the period of time from the instant at which the switching element 17 is turned ON and the current I flows until the instant at which the switching element 17 is turned OFF, l1 and l2 are obtainable by measuring the current value when the switching element 17 is turned OFF, and furthermore L1 and L2 can be determined. When discharge points are concentrated, the current values during the period T of the discharge current become almost equal. A discharge concentration detecting device 30 is used to detect the presence of the concentration of discharges based on the above principle, which is described by reference to a time chart in FIG. 3 and a block diagram in FIG. 4.

Figure 3:
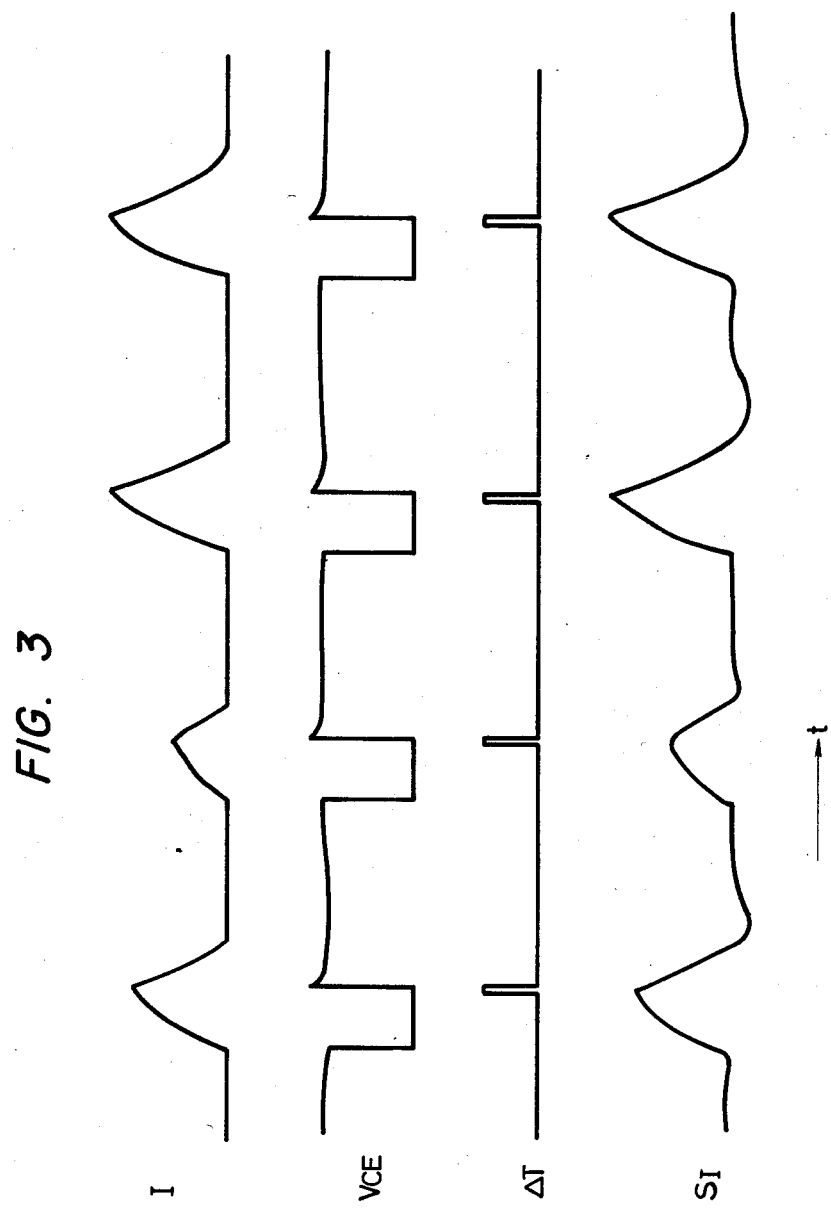
FIG. 3 is a chart illustrating the relation between current and detected waveforms.

I in FIG. 3 shows the interpole current waveform observed by CT for current detection, whereas VCE shows the state of the switching element 17 when it is turned ON and OFF. The signal generated by a control circuit 20 when the switching element 17 is turned OFF is shown by ΔT.

Figure 4:
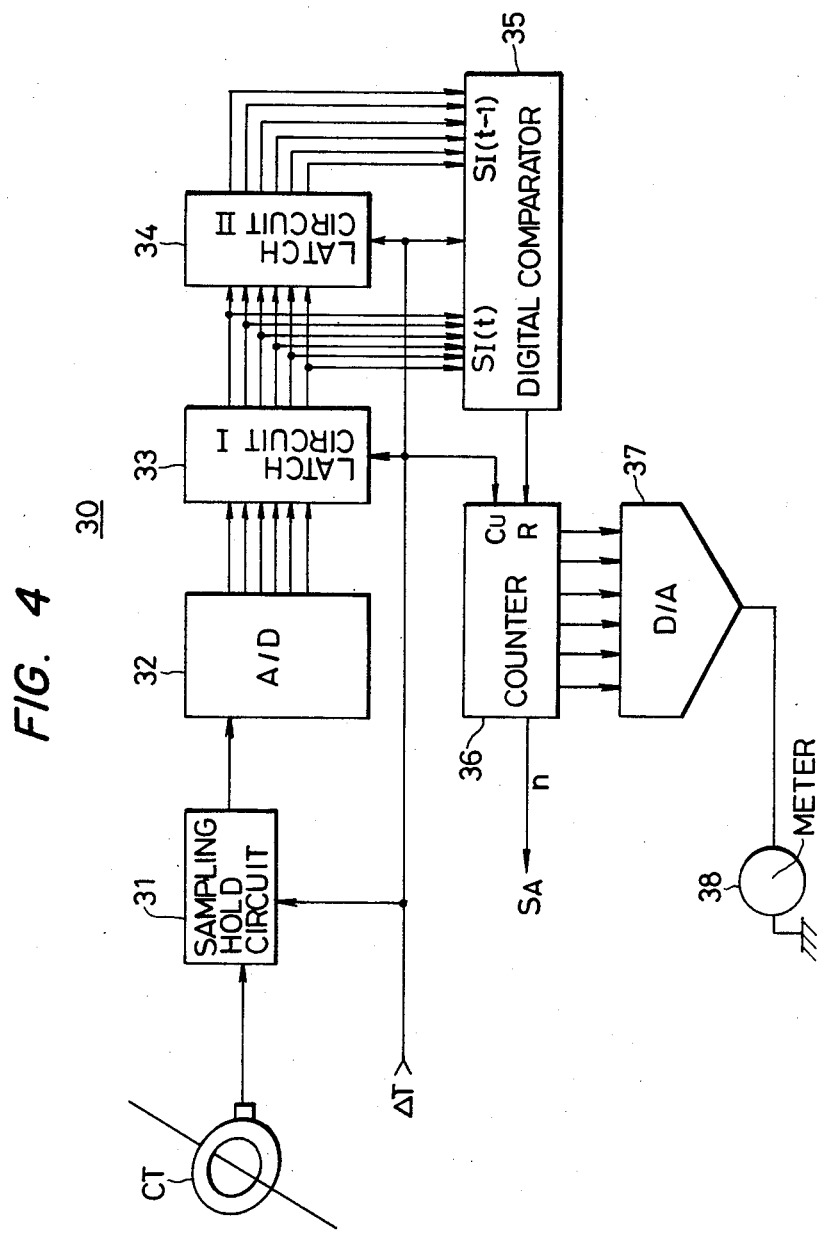
FIG. 4 is a block diagram of an arrangement for detecting the concentration of electric discharges.

In FIG. 4, a current signal SI in FIG. 3 is held by a sample-hold circuit 31 at timing ΔT and the value held is temporarily stored in a latch circuit 33 as a digital value after conversion by an analog/digital converter 32. The latch circuit 33 is arranged so as to shift this signal to a latch circuit 34 in the next stage according to the above-mentioned signal ΔT. As a result, the current value SI at ΔT one timing before and SI at the next ΔT can be read from the input and output values of the latch circuit 34. In this case, each of the signals SI(t), SI(t−1) is applied to a subtraction circuit or a digital comparator 35 to detect the difference and, should there be any difference, that is, in the absence of the concentration of electric discharges, a counter 36 is reset whereas if there is no difference, that is, in the presence of a concentration of electric discharges the counter counts up. When the contents of the counter 36 have reached a preset value n, the occurrence of n continuous concentrations of electric discharges is detected. In the present embodiment, ΔT itself is employed as a digital pulse for the counter and, since the counter is not reset when electric discharges are concentrated, a discharge concentration warning signal S is generated when the contents of the counter 36 exceed the preset value n, when the concentration of electric discharges n consecutive times occurs. In addition, the concentration of electric discharges can be visually checked by equipping the counter 36 with a digital/analog converter 37 so as to indicate the analog "signal" by means of a meter 38 or LED.

Figure 5:
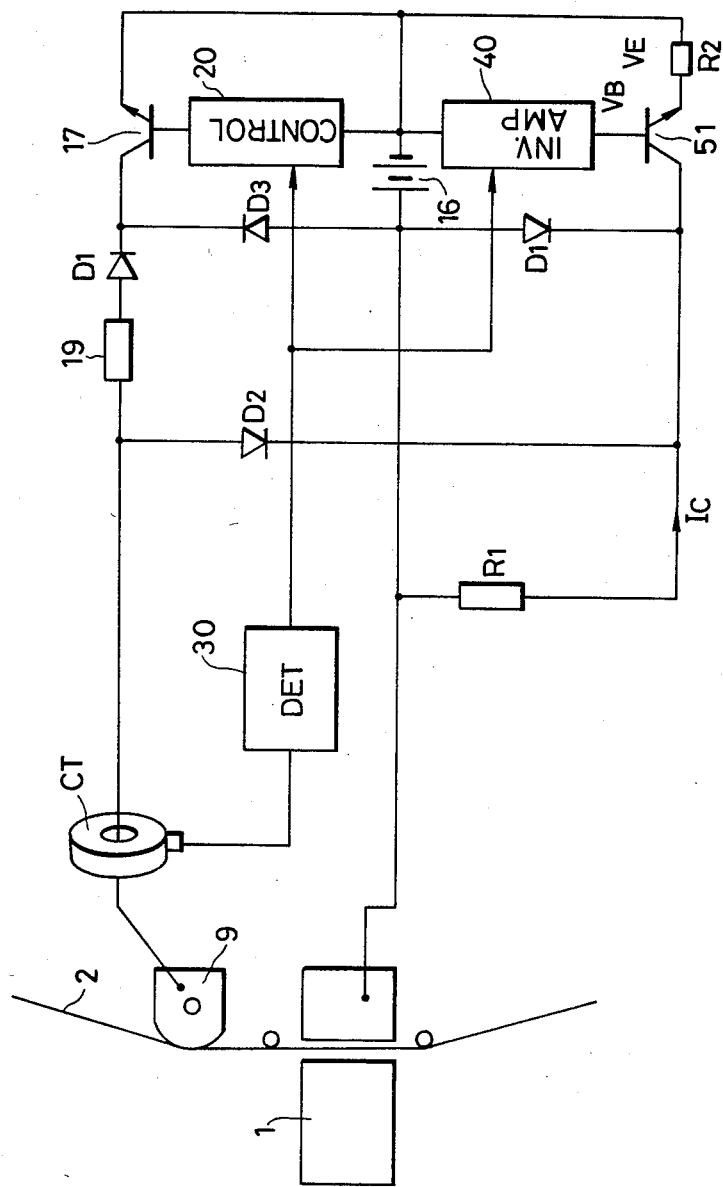
FIG. 5 is a diagram of a circuit for controlling the voltage applied across the interpole gap.

Another exemplary embodiment of the present invention in FIG. 5 shows an example of the voltage applied across the interpole gap, wherein the voltage is changed according to the aforementioned output signal. If the voltage for starting an electric discharge is reduced, the electric discharge will hardly be caused and the concentration of electric discharges within the interpole gap can be prevented. Moreover, the electric discharge voltage can readily be increased by increasing the voltage applied across the interpole gap in the absence of a concentration of electric discharges.

An amplifier 40 in FIG. 5 is used to apply an amplified analog voltage corresponding to the output of the counter 36 to the base of a transistor 51. The voltage Vg applied across the interpole gap is given as follows:

$$Vg = -IcR1 \quad (1)$$

Ic is roughly equal (about 99%) to the current flowing through the emitter follower load R2 of the transistor 51 and can expressed by the following expression, noting that the base-emitter voltage of transistor 51 will be very small in comparison to the remaining relevant voltages and can be ignored for purposes of the present analysis:

$$Ic = VE/R2 = VB/R2 \quad (2)$$

Therefore, from equations (1) and (2)

$$Vg = -R1/R2 \, VB \quad (3)$$

If R1=30 KΩ; R2=1 KΩ and E=300 V, Vg will show a change ranging from 0−−300 V for the change of VB ranging from 0−10 V.

If the contents of the counter 36 increase because of the occurrence of a concentration of electric discharges, the output of the inverting amplifier 40 will decrease, causing the interpole voltage Vg to be reduced and the concentration of electric discharges to be eliminated.

Figure 6:
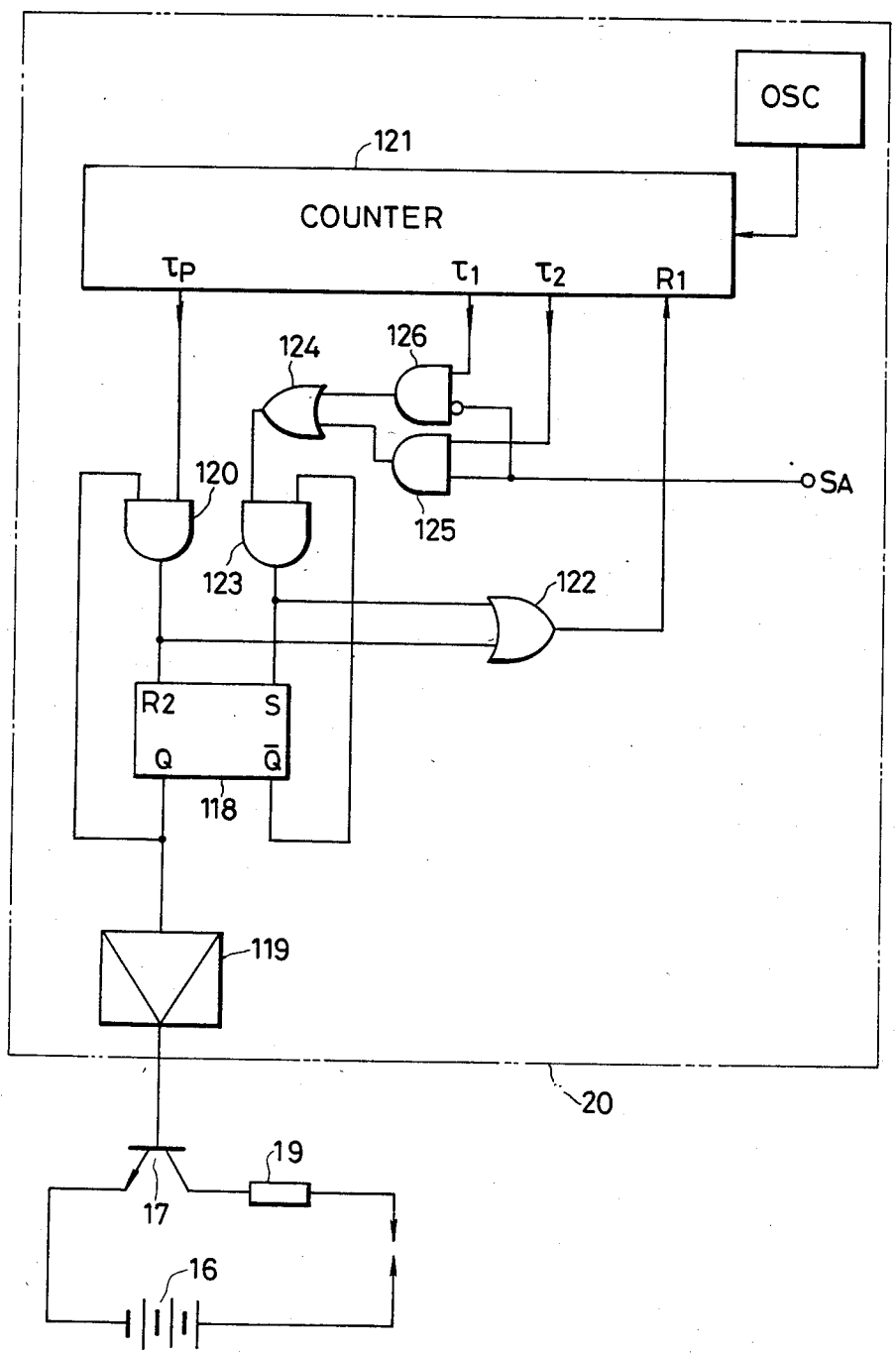
FIG. 6 is a diagram of a circuit for controlling the quiescent time of the pulse voltage.

As another exemplary embodiment of the present invention, there is shown in FIG. 6 an arrangement wherein the quiescent time of the pulse voltage, or OFF time of the switching element 17, is prolonged on the basis of the output obtained by the detection circuit.

An RS flip flop 118 in FIG. 6 causes the switching element 17 to establish an ON state through an amplifier 119 when the output Q=1; this indicates the ON time, whereas the OFF time is when Q=0. An AND gate 120 receives the signal Q and an output τp of the time setting counter 121. Under the condition that the output Q is "1", when τp rises, the AND gate outputs a signal to reset the flip flop 118. The output Q remains at "1" during the time until the ON time setting output τp of the time setting counter 121 becomes "0". Simultaneously with the rise of τp, because the output of the AND gate 120 resets the oscillator OSC and time setting counter 121 through an OR gate 122, the counting operation is again started from the beginning. When Q=0, $\overline{Q}$=1 and consequently the output Q=1 is not produced until one of the gates of an AND gate 123, or the output of an OR gate 124, becomes "1". The OR gate 124 and AND gates 125, 126 are used to control the OFF time setting in the two stages and are so arranged that OFF time τ1 is set when the signal SA (FIG. 4) is "0" and OFF time τ2 is set when the signal SA is "1".

Thus, the present invention is intended to prevent the concentration of electric discharges and the fusing of the wire electrode by carrying out machining with OFF time τ1 during normal electric discharge and with OFF time τ2 at the time of an abnormality (τ1<τ2), and the electric discharge machine constructed according thereto is characterized in that the concentration of electric discharges is detected by examining whether successive current waveforms at the time of electric discharge are the same or not.

Although the above description has referred to two OFF times τ1, τ2, the same effect is obtainable by continuously setting the OFF time according to the contents of the counter 36 used to detect concentrated electric discharge points.

What is claimed is:

1. A wire cutting type electric discharge machine, comprising:
   (1) a wire electrode for passing through a conductive workpiece;
   (2) an operating power supply for applying a pulse-like voltage across a gap between said wire electrode and said workpiece to cause a discharge across said gap at a discharge position;
   (3) interpole current detecting means for detecting the location of discharge positions along said gap at different times across said wire electrode and said workpiece by means of a current waveform as a function of the inductance at the discharge point of said wire electrode; and (4) discharge concentration detecting means responsive to said interpole current detecting means for detecting a concentration of said discharge positions when a plurality of discharges occur at substantially the same point.

2. An electric discharge machine as claimed in claim 1, wherein said wire electrode is supplied from a wire supply reel, passes through a lower wire guide and said workpiece, reaches an upper guide and is then wound on a reel serving as a tension roller, via an electric energy supply assembly.

3. An electric discharge machine as claimed in claim 1, wherein said operating power supply comprises a d.c. power line, a switching element, a current limiting resistor, and a control circuit for controlling said switching element.

4. An electric discharge machine as claimed in claim 1, wherein said workpiece is supported on a table moved in a two-dimensional plane by an X-axis driving motor and a Y-axis driving motor.

5. An electric discharge machine as claimed in claim 2, wherein said interpole current detecting means comprises a current transformer for detecting the current flowing through said electric energy supply assembly.

6. A wire cut electric discharge machine as claimed in claim 1, wherein said discharge concentration detecting means comprises a sample-hold circuit for holding a current signal detected by said interpole current detecting means at a predetermined timing; an analog/digital converter circuit for converting the value held by said sample-hold circuit into a digital quantity; a first latch circuit for temporarily storing a digital signal output by said converter circuit; a second latch circuit for shifting the signal stored by said first latch circuit with said predetermined timing signal; a comparator for comparing the input and output of said second latch circuit and for detecting the difference between the current values at consecutive timings; and a counter for up-counting at said predetermined timing when the output of said comparator is zero and for generating a discharge concentration warning signal when the value counted reaches a predetermined value.

7. An electric discharge machine as claimed in claim 6, wherein said discharge concentration detecting means includes display means for allowing the condition of discharge concentration to be visually checked on receiving the output of said discharge concentration detecting means.

8. A wire cutting type electric discharge machine, comprising:

(1) a wire electrode passing through a conductive workpiece;
(2) an operating power supply for applying a pulse-like voltage across a gap between said wire electrode and said workpiece to cause a discharge across said gap at a discharge position;
(3) interpole current detecting means for detecting the location of discharge positions along said gap at different times across said wire electrode and said workpiece by means of a current waveform as a function of inductance at the discharge point of said wire electrode;
(4) discharge concentration detecting means responsive to said interpole current detecting means for detecting a concentration of said discharge positions when a plurality of discharges occur at substantially the same point; and
(5) discharge concentration elimination means operated in response to the output of said discharge concentration detecting means, for eliminating the discharge concentration.

9. An electric discharge machine as claimed in claim 8, wherein said operating power supply comprises a d.c. power line, a switching element and a current limiting resistor connected to said d.c. power line in series, and a control circuit for controlling the ON/OFF operation of said switching element.

10. An electric discharge machine as claimed in claim 8, wherein said discharge concentration elimination means comprises interpole voltage regulating means for regulating the pulse-like voltage applied across said machining gap.

11. An electric discharge machine as claimed in claim 8, wherein said discharge concentration elimination means comprises quiescent time regulating means for regulating the quiescent time of the pulse-like voltage applied across said machining gap.

12. An electric discharge machine as claimed in claim 10, including counter means for compiling a count value representative of a number of consecutive instances of discharge concentration, and an amplifier having an output varying inversely with said count value, for lowering the interpole voltage in response to higher count values.

13. An electric discharge machine as claimed in claim 11, said quiescent time regulating means including gate circuitry receiving a discharge concentration warning signal from said discharge concentration detecting means, and for setting a higher quiescent time value in response to said warning signal.

14. An electric discharge machine as claimed in claim 13, further including time setting counter means operable to effect at least two quiescent time values, and a flip-flop circuit receiving outputs from said gate circuitry and said time setting counter means for controlling said quiescent time.

* * * * *